United States Patent [19]

Foerster

[11] 4,290,081

[45] Sep. 15, 1981

[54] METHOD AND APPARATUS FOR STOP FRAME REPRODUCTION IN TELEVISION PICTURE FIELDS EACH RECORDED ON TAPE IN A PLURALITY OF ADJACENT TRACKS

[75] Inventor: Hubert Foerster, Darmstadt, Fed. Rep. of Germany

[73] Assignee: Robert Bosch GmbH, Stuttgart, Fed. Rep. of Germany

[21] Appl. No.: 26,335

[22] Filed: Apr. 2, 1979

Related U.S. Application Data

[63] Continuation of Ser. No. 841,178, Oct. 11, 1977, abandoned, which is a continuation-in-part of Ser. No. 840,026, Oct. 6, 1977, abandoned.

[30] Foreign Application Priority Data

Oct. 9, 1976 [DE] Fed. Rep. of Germany ....... 2645747

[51] Int. Cl.³ .............................................. H04N 5/76
[52] U.S. Cl. .......................................... 358/4; 360/10; 360/72.2; 360/74.4; 358/127
[58] Field of Search ....................... 360/10, 14, 35, 33, 360/72.1, 72.2, 72.3, 74.1, 74.4, 74.5; 358/4, 127

[56] References Cited

U.S. PATENT DOCUMENTS 3,454,713 7/1969 Yanagimachi ........................ 360/10
3,573,360 4/1971 Rose ...................................... 360/73
3,594,729 7/1971 Uemura ................................. 360/10
4,001,882 1/1977 Fiori ...................................... 360/14

Primary Examiner—Alan Faber
Attorney, Agent, or Firm—Frishauf, Holtz, Goodman & Woodward

[57] ABSTRACT

Successive picture fields in normal operation are successively written into a one-field memory and displayed by nondestructive read-out. A stop order stops the tape while the last recorded picture field is continuously displayed and backs up the tape to a point from which it can be restarted to store either the next preceding or the next following picture field, according to the next order entered into the equipment. An address memory is supplied with addresses read off the tape by a counter roller and a timing mark reading head. A stop order interrupts the advancing of the address in storage by the tape advance reading head, causing the tape to be stopped and backed up at the end of memorizing the picture field being reproduced. A forward step or backward step order increments or decrements the address memory and restarts the tape, and when the addressed picture field is reproduced, it is stored in the memory, after which the usual stop and back-up automatically takes place. An order for resumption of progressive television picture reproduction can also be supplied to the system.

6 Claims, 2 Drawing Figures

METHOD AND APPARATUS FOR STOP FRAME REPRODUCTION IN TELEVISION PICTURE FIELDS EACH RECORDED ON TAPE IN A PLURALITY OF ADJACENT TRACKS

This is a continuation of Ser. No. 841,178, filed on Oct. 11, 1977, now abandoned which in turn was a continuation-in-part of Ser. No. 840,026, filed on Oct. 6, 1977, now abandoned.

This invention concerns a method and apparatus for producing stop frame views of tape-recorded television pictures in which the taped record can be stepped back or forward in the reproducing or recording and reproducing equipment so as to enable the preceding or following picture to be viewed and possibly selected after viewing a first selected picture.

PRIOR ART

Television magnetic tape recording and reproducing devices fall generally into two classes, one in which each picture field, conventionally half of an interlaced two-field picture, is recorded on a single relatively long track obliquely crossing the tape and another class in which a picture field is recorded in a succession of neighboring shorter tracks. With apparatus of the first-mentioned class, the still-picture reproduction of individual picture fields is possible with certain limitations, and likewise shifting at the viewer's choice to the next or preceding picture field. Still-picture reproduction on a stop frame basis is not readily feasible for magnetic tape recordings produced or used in devices of the second-mentioned class.

THE PRESENT INVENTION

It is an object of the present invention to provide a practical method and practical apparatus for still-picture presentation of individual recorded pictures of the kind in which the television signals corresponding to a picture field are recorded in a series of neighboring tracks on a tape medium, making possible at the same time stepping the tape back or forward to a preceding or following picture.

Briefly, signals corresponding to a picture field are written into a picture storage memory with normal tape transport and reproducing head operation, and these signals are repetitively read out nondestructively once they are stored. The tape can be stopped of course at this point, but provision is also made for backing it up to a point from which it can obtain sufficient velocity upon renewed forward movement by the tape transport to reproduce and store in the memory a picture field preceding the one last written in, preferably the next preceding picture field after which that field can be written in, repeating the previous steps to provide a repetitive read-out of the preceding picture. By a similar advance command, the tape can be caused to store the next succeeding picture field for still-picture display.

The picture storage memory needs only to store one field and can be a solid state memory. Preferably, a picture address is stored in an address memory before the selected picture is written into the picture field memory and the writing in of the television signals of a picture field is done in response to the operation of an electronic switch set by a coincidence circuit that compares the picture address with signals from timing marks and from a counter responsive to the movement of the tape, so that the storage will begin with the beginning of the desired picture field. Thus, a stop control button will command the storage of the current picture field, after which the tape preferably is immediately backed up so that the next previous field can be stored in memory on the next operation if desired. A back-up command will reduce the address by one unit. The tape is already at a point from which it can gain the necessary velocity for proper reproduction of a picture at the stored address, namely the next preceding picture if back-up has been ordered. After every picture field storage, the tape is stopped and backed up far enough to play the next preceding field on the next operation. An advance command will increment the address so that the reproducing head will furnish to the picture memory the signals for the next following picture when the necessary address match occurs.

In addition to the evident advantages of the invention by making it possible to view individual picture fields of a television tape record, there is the further advantage that the usual synchronizing of the zero crossing phase of the color carrier of color television pictures that is done in studio practice can be easily dispensed with in order to obtain a quicker stepping ahead and back of the display to neighboring picture fields.

DRAWINGS, ILLUSTRATING AN EXAMPLE

EXPLANATION OF PRINCIPLES

Figure 1:
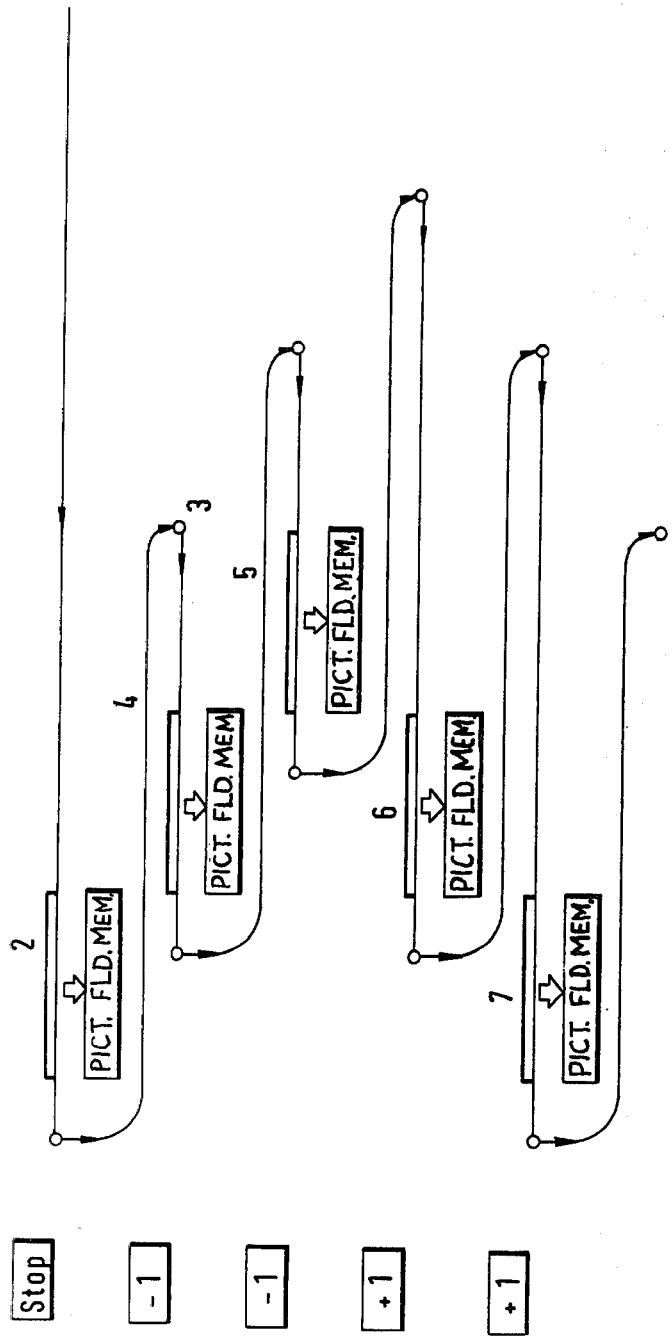
FIG. 1 is an explanatory diagram representing a movement of the tape back and forth in the practice of the invention.
Figure 2:
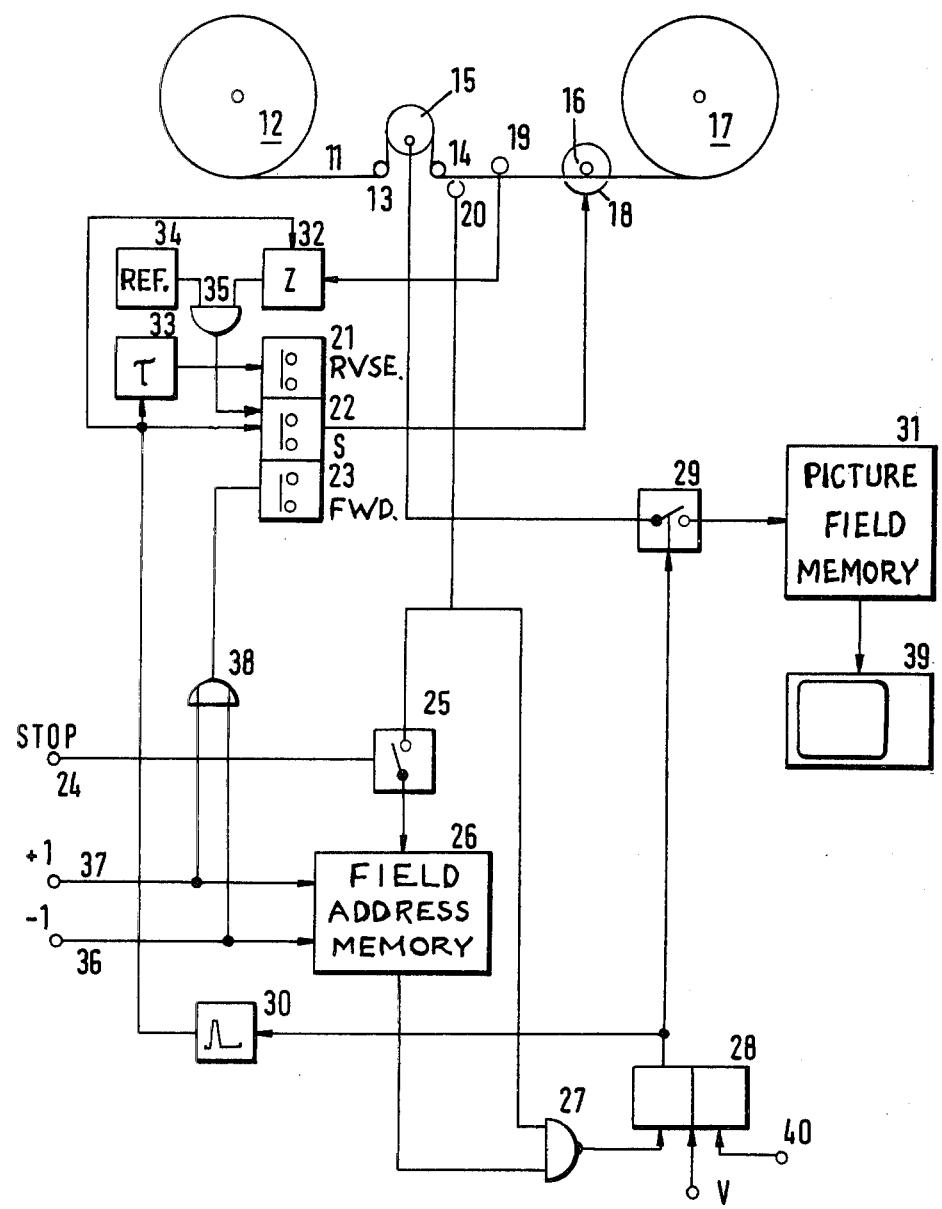
FIG. 2 is a circuit diagram in block form of an apparatus for practicing the invention.

FIG. 1 represents the manipulation of the tape in response to stop, step back and step forward orders provided to the apparatus of FIG. 2, for reproducing still pictures, a first picture field and then other adjacently recorded picture fields preceding the first one on the tape. For this invention as such, it is of no significance whether a picture field is an interlaced half of a full picture or is a full picture, and reference will accordingly simply be made to a picture field, regardless of whether it is half of an interlaced picture or a full picture in itself that is temporarily stored.

It is assumed for the explanation of FIG. 1 that the tape is moving at normal picture-reproduction speed and that the signals thus reproduced are being made visible. If now stop frame reproduction of a single picture field is desired, the command "stop" is provided by actuating a corresponding button, with the result that the next picture field will be written into a picture field memory. After this picture field, designated 2 in FIG. 1, has been written into the memory, the tape is stopped by a corresponding control that is further described in connection with FIG. 2, and it is at once moved backwards far enough for the tape to take the position 3 from which by renewed forward advance the record of a picture field preceding the picture field 2, namely the picture field 4, will reach the tape speed necessary for reproduction by the time it reaches the pick-up head.

Of course, the reverse run can also be controlled so that it is possible to reproduce a picture field that precedes the picture field 2 by several fields, but even in the illustrated case this can be obtained by repeated stepping back.

In the next line down in FIG. 1, a further stepping back movement is shown that immediately follows the storage field 4 to prepare for storage of the picture field 5 that precedes the picture field 4 in case the next order should require that.

The next line down in FIG. 1 shows the effect of pressing a key designated "+1" for advancing to the next later picture, in this case one that was previously observed, and putting the signals of that picture field into the memory, as the tape passes those signals through the reproduction head and the next line shows another forward step. In this illustration, pictures 6 and 7 viewed on the forward steps will correspond to pictures 4 and 2 respectively.

In the mode of operation illustrated in FIG. 1, the stop order automatically produces a back step for the next operation and each "−1" or "+1" order does the same, after the newly addressed field is stored in memory, setting back the tape to a place suitable for showing either the next farther back picture or the next later picture according to whether the next order is a "−1" or a "+1". The placing of the correct picture field into the picture field memory is determined by a picture address system as will presently be described in connection with FIG. 2. Conceivably, the backing up of the tape could be the first tape movement in response to an order, rather than the last, but the sequence illustrated in FIG. 1 has the advantage that while the selected field is being observed by repetitive read-out of the memory, the tape is moved to a position from which it can step either forward or back, thus saving time in the selection, out of a succession of fields, of a particular field for display. The display of the particular field can be continued as long as desired.

DETAILED DESCRIPTION

FIG. 2 shows only those portions of a magnetic tape recording and reproducing apparatus for television signals that is necessary to take into account for understanding the present invention. The magnetic tape 11 is advanced from a supply reel 12 over path-changing rollers 13 and 14, a reproducing device 15, a tape drive roller 16 to a take-up reel 17. The tape drive roller 16 is driven by a motor 18.

For determining the position of the tape, a counter roller 19 and a time mark reading head 20 are provided, such as are commonly provided in magnetic tape recorder/reproducer equipment. The counter roller 19 is driven by the tape and is equipped with peripheral optical or magnetic features cooperating with an optical or magnetic detector that produces a certain number of pulses for each revolution of the counter roller 19. The time mark reading head 20 reproduces the time mark indicating the beginning of each of the picture fields recorded on the tape 11, these timing marks being provided on a longitudinal track of the tape.

Of course, means are provided in a magnetic recording/reproducing device for pressing the tape against the rollers 16 and 19 and against the head 20, but these are not represented in FIG. 2 in order to simplify the drawing.

The arrangements for control of the tape transport that are in themselves well known and are generally quite complicated are represented in FIG. 2 merely by three switches 21, 22 and 23 by means of which corresponding voltages are supplied to the tape drive motor 18. In this connection, it should be mentioned that in the usual magnetic tape recording and reproducing devices, motors for the reels 12 and 17 are automatically controlled in such a way that a predetermined tape tension is maintained.

If now a particular picture field is to be reproduced as a still picture, a "stop" command is provided by providing a signal at the input terminal 24 of FIG. 2. The switch 25 is thereby closed and the address given by the magnetic head 20 is inserted into the address storage memory 26. The output of the address memory, at which the signals written in are practically immediately available for nondestructive read out, is connected with one of the inputs of a coincidence circuit 27, of which the other input is connected to the address pulse 5 code provided by the head 20. Since both addresses are the same, the switch 29 will be closed during the next following picture by means of the bistable switch 28 to which a vertical frequency pulse V is supplied at the beginning of the picture field. This picture field is then written into the picture field storage memory 31. On the trailing edge of the pulse provided to the switch 29, the trigger pulse generating circuit 30 produces a sharp pulse which is furnished to the switch 22 for stopping the tape in place. This last pulse also causes a counter 32, which counts the pulses produced by the counting roller 19, to be reset to zero.

The pulse produced by the circuit 30 also puts into operation a delay circuit 33 which shortly thereafter switches the tape transport mechanism into reverse drive. The distance over which the tape is thereafter moved is determined by counting the pulses produced by the counting roller 19. This count is compared with a count value set into the reference count register 34, the comparison being accomplished by the AND-gate 35. When coincidence occurs, the switch 32 is actuated to cause the tape to be held in position, this position being illustrated for example at 3 in FIG. 1.

For still-picture reproduction of a preceding or following picture field, command signals are provided at the input 36 or the input 37 as the case may be. These signals, in either case, activate the OR-gate 38 to operate the switch 23 and start the tape running forward and, in addition, increment or reduce by 1, as the case may be, the address stored in the address memory 26.

When the tape 11 reaches the position at which the desired picture field can be picked up from the tape and written into the picture field storage memory 31, the time marker reading head supplies the necessary address with its time mark signal, which coded address corresponds exactly with the one present in the address memory 26, so that the switch 29, as already described above, will be closed while the picture signals are being stored in the picture field memory, after which, as already described, the tape transport will be stopped, backed up, and finally stopped again.

The picture field storage memory 31 can consist of a solid state memory of which a large variety are known and commercially available. For writing the picked-up television signals into the memory, the signals can be conventionally decoded, converted from analog to digital and stored in digital form. The continually repeated nondestructive reading of television signals out of such a memory is also so well known that it is not necessary to describe how picture fields stored in the memory 31 can be continuously displayed, as for example by the television display device 39 shown in FIG. 2.

By supplemental control of the bistable switch circuit 28 by means of a signal supplied to the input 40, the switch 29 can be caused to be continuously closed during normal progressive operation of television picture reproduction by the tape recorder/reproducer illustrated in the upper part of FIG. 2, so that new signals are continuously written into the picture field memory 31 and each field is represented on the screen of the display apparatus 39 in the same way in which pictures are normally displayed in operation of a television signal reproducer picking up signals from a television tape record.

In the reproduction of color television in the operations of a television studio, it is generally necessary to synchronize magnetic tape reproducers in such a way that the phase of certain important signals picked up from the magnetic tape and those obtained from other sources should be synchronized. In the PAL system, the switching phase of a color difference signal is repeated after two complete pictures. The running in or "onset" of operation of a magnetic tape equipment necessary to bring it into synchronism on this account takes place correspondingly more slowly. By a suitable design of the picture field memory and/or that of a decoder contained therein or associated therewith, this requirement can be dispensed with, so that onset of operation of a magnetic tape device can be accelerated, which represents a substantial improvement in practical operation. The same holds for the SECAM system and even for the NTSC system, in which a repetition of the phase relation of the color carrier occurs for every full picture and the practice of the present invention can produce an acceleration of the running in of the tape device if no account need be taken of the variation aspect of the respective half-picture fields.

The time marks reproduced by the time mark reading head 20 are previously recorded on a longitudinal track of the magnetic tape in binary coded form, for example in Manchester-II code, and are representative of the respective individual picture fields.

An acceleration of the speed run-up can thereby be obtained by having the timing pulse generator for the vertical synchronizing signals provided at the bistable switch 28 possess so small time-constant that it can be pulled into synchronism by the vertical synchronizing signals picked up from the magnetic tape. The magnetic tape then, immediately after running up to speed, produces a video signal proper by the CCIR standard, although not in studio synchronization. Writing into the picture-field memory can be done with this synchronism and reading out with the studio synchronism. The video signal available at the output of the picture-field memory is then in then in studio synchronism without the necessity of waiting for a time-consuming synchronizing process of the magnetic tape apparatus.

Although the invention has been described with reference to a particular illustrative embodiment, variations are possible within the inventive concept.

I claim:

1. A method of reproducing individual pictures selected by stepwise inspection of a sequence of television picture fields from tape-recorded television signals having picture field addresses corresponding to position on the tape, for critical examination of events recorded in said sequence of fields, comprising the steps of:
   storing in an address storage memory the address of a picture field to be repetitively reproduced;
   establishing normal pick-up of tape-recorded television signals while keeping track of the positions on the tape of the picture fields successively picked-up;
   writing in the signals corresponding to said picture field to be repetitively reproduced into a picture storage memory during normal television signal pick-up of said tape-recorded signals in response to the detection of the tape position corresponding to said stored address;
   repetitively reading out nondestructively the signals so stored in said memory;
   stopping and reversing the tape movement in response to completion of the writing of said signals corresponding to said picture field into said memory and then automatically stopping the tape again after backing it up to a point from which it can obtain sufficient velocity upon renewed forward movement to pick up and store in said memory a picture field which precedes, by a first predetermined number of picture fields, the picture field last written into said memory, and, concurrently with reversing the tape movement and stopping it again, modifying the address storage memory to store the address of a picture field preceding or succeeding, selectedly, by said first predetermined number of picture fields, the picture field stored by said corresponding signals in said picture storage memory, the extent of said backing up being determined by a second predetermined number of picture fields exceeding said first predetermined number of picture fields.

2. A method as defined in claim 1, in which the address of the preceding rather than the succeeding picture field is selected in the address modifying step in a first cycle of performance of the method and, after the step of reversing the tape and stopping it again, normal pick-up of signals from the tape is re-established by restarting the tape in a normal forward movement and succeeding steps of the method are repeated at least up to and including the repetitive read-out step, for the purpose of observing the picture field signals of the field just preceding the field of which the signals were first observed in the repetive read-out step of said first cycle of the method.

3. A method as defined in claim 2, in which a further repetition of steps of the method is performed for reading the next preceding picture at least once, and in which, after the observing of at least two pictures, at least one address-modifying step is performed by which the picture field succeeding rather than preceding the last-observed picture is selected, resulting in storage of signals of said succeeding picture field, thereafter followed by repeating the repetitive nondestructive read-out step.

4. A method as defined in claim 3 in which the step of modifying the address is performed by selectably either incrementing or diminishing by 1 the address stored in the address storage memory.

5. A method as defined in claim 1, in which the step of repetitively reading out nondestructively the signals stored in the memory is operated, in at least one of a succession of cycles of the method steps, without regard to the synchronization of the phase of a color carrier in the signals so stored in order to obtain a quick onset of the pick-up and storage operation.

6. Apparatus for reproducing selectable individual pictures from tape-recorded television signals comprising, in combination with equipment containing at least a tape transport mechanism and a television signal pick-up head, further components, comprising:
   tape-driven counting means;
   a reading head for timing signals recorded on a control track accompanying tape-recorded television signals;

control means for said tape transport mechanism for setting and performing commands for start, stop, forward step and backward step and for both backing up the tape for a predetermined number of pictures and thereafter stopping the tape in response to each stop order;

picture address storage memory means for storing the address of an individual picture field to be reproduced;

coincidence circuit means connected to the content of said picture address storage memory means and to the output of said timing mark reading means for detecting a tape position from which a picture field to be reproduced is immediately available for pick-up;

picture field storage memory means for storing signals of a selected single picture field;

an electronic switch (29) responsive to operation of said coincidence circuit means (27) for connecting said pick-up head (15) to said picture storage memory means (31) during the pick-up of tape-recorded television signals corresponding to a particular picture field to be reproduced, and means for incrementing or decrementing, selectably, the content of said picture address storage memory means (26) by 1 respectively in response to actuation of a forward step order or a backward step order provided to said control means, whereby when, upon operation of said address memory incrementing and decrementing means, a start command is provided, said picture field memory means will be caused to store, for viewing thereof, a picture field selected by the new content of said address memory means.

* * * * *